(12) United States Patent
Kise et al.

(10) Patent No.: US 8,094,447 B2
(45) Date of Patent: Jan. 10, 2012

(54) DISPLAY DEVICE HAVING WIND PATH PLATE

(75) Inventors: Koji Kise, Tokyo (JP); Kazuhiro Ioki, Tokyo (JP); Yoshimi Iwasaki, Tokyo (JP); Hironobu Kawaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1036 days.

(21) Appl. No.: 11/972,333

(22) Filed: Jan. 10, 2008

(65) Prior Publication Data

US 2008/0170015 A1   Jul. 17, 2008

(30) Foreign Application Priority Data

Jan. 11, 2007   (JP) ................. 2007-002974

(51) Int. Cl.
*H05K 7/20* (2006.01)
*F28F 7/00* (2006.01)
*H05K 5/00* (2006.01)
*F21V 29/00* (2006.01)

(52) U.S. Cl. .............. 361/679.49; 361/695; 165/80.2; 257/721; 174/16.1; 454/184; 362/373; 362/218; 362/294

(58) Field of Classification Search .......... 361/694–695, 361/679.48–679.51; 165/80.2; 257/721; 174/16.1; 454/184; 312/236; 362/373, 218, 362/264, 294

See application file for complete search history.

(56) References Cited

U.S. PATENT DOCUMENTS

| | | | |
|---|---|---|---|
| 5,497,573 A * | 3/1996 | Stadjuhar et al. | 40/564 |
| 6,154,362 A | 11/2000 | Takahashi et al. | |
| 6,833,674 B2 | 12/2004 | Kaneko et al. | |
| 2003/0043091 A1 | 3/2003 | Takeuchi et al. | |
| 2004/0208009 A1 * | 10/2004 | Mardon et al. | 362/373 |
| 2006/0077193 A1 * | 4/2006 | Thielemans et al. | 345/204 |
| 2008/0089028 A1 * | 4/2008 | Kim et al. | 361/695 |

FOREIGN PATENT DOCUMENTS

| | | |
|---|---|---|
| JP | 10-293540 | 11/1998 |
| JP | 11-237844 | 8/1999 |
| JP | 2000-267576 | 9/2000 |
| JP | 2002-6754 | 1/2002 |
| JP | 2002-318542 | 10/2002 |
| JP | 2003-76286 | 3/2003 |
| JP | 2005-134849 | 5/2005 |
| JP | 2005-265922 | 9/2005 |
| JP | 2007/66115 | 8/2007 |

* cited by examiner

*Primary Examiner* — Zachary M Pape
(74) *Attorney, Agent, or Firm* — Oblon, Spivak, McClelland, Maier & Neustadt, L.L.P.

(57) ABSTRACT

A display device includes a substrate having light emitting elements for display on a front surface; a substrate supporting body having an opening in the center and positioned on the back surface side of the substrate to support a peripheral region of the substrate; a case body positioned on the back surface side of the substrate supporting body and covering a part of the center opening; a fan unit arranged in the case body; a wind path plate arranged between the fan unit and the back surface of the substrate and forming a wind path to pass airflow generated by driving the fan unit only on the back surface side of the substrate; and a power supply arranged in the case body and on the back surface of the wind path plate; and wherein the airflow impinges the wind path plate through the fan, thereafter passes through the wind path and is discharged to the outside from the back side of the wind path plate. According to the present invention, it is possible to cool down a substrate uniformly and efficiently in a display device using light emitting elements arranged on the substrate without raising cost or complicating the structure.

9 Claims, 4 Drawing Sheets

2 : Wind path
2A : First wind path opening
2B : Second wind path opening
4 : Wind path plate
10 : Substrate
11 : Light emitting element
13 : Interface-connector
14 : Power supply connector
15A, 15B : Capacitor
20 : Substrate supporting body
30 : Case body
35 : Fan unit
36 : Power supply
U1 : Unit 2 : Wind path
2A : First wind path opening
2B : Second wind path opening
4 : Wind path plate
10 : Substrate
11 : Light emitting element
13 : Interface-connector
14 : Power supply connector
15A, 15B : Capacitor
20 : Substrate supporting body
30 : Case body
35 : Fan unit
36 : Power supply
U1 : Unit 20h : Center opening (of substrate supporting body)

4': Wind path plate

U2: Unit
4h, 4k: Halfway opening

- U3 : Unit
- 41 : Back plate (of substrate supporting body)
- 43 : Receiver part (of substrate supporting body)
- 49 : Opening
- 50 : Case body

DISPLAY DEVICE HAVING WIND PATH PLATE

BACKGROUND OF THE INVENTION

1. Field of the Invention

The present invention relates to a display device including light emitting elements for display and more particularly, to a display device including a fan unit capable of preventing a temperature elevation due to heat generated by the emission of the light emitting elements.

2. Description of the Related Art

Recently, a display device using a plasma display, a liquid crystal display, a field emission display, a light emitting diode (hereinafter, referred to as the LED appropriately) or the like is widely known in general in a field of the display device, and it is increasingly employed together with a conventional display device using a CRT (Cathode Ray Tube) or a discharge tube, or instead of this.

However, according to the above display device, since its light conversion efficiency is low and it is about 10% in the case of the LED element, it means that a most part of supply power is converted to heat. When the element temperature is increased, since the light conversion efficiency is further lowered, it is required to prevent the temperature of the element from increasing with some cooling measures. In addition, when the element temperature is lowered, the element deterioration can be prevented and the reliability can be enhanced over a long period of time.

Especially, in the case of the display device using the light emitting element such as the LED element, unlike the one using the conventional CPU and the like, elements to be a light emitting source, that is, a heat generating source are arranged almost all over the surface of the display device at certain intervals in general. And the whole surface of the display device must be cooled uniformly. When the substrate on which the light emitting elements are arranged is partially cooled, the element temperature is largely lowered only at a part having high cooling efficiency due to said cooling and the light conversion efficiency of the element is partially raised, which causes color unevenness. Therefore, in this case, the functionality as the display device is degraded.

As a method to cool the display device using the LED element, as described in a patent document 1 (Japanese Patent Laid-open Publication No. 10-293540: refer to paragraph [004] thereof), a method for releasing heat to the outside by thermal conduction of a lead terminal of the LED is used in general. However, when the display device is set outdoors, the lead terminal is molded with a resin and the like to be waterproof, so that the heat releasing effect of the lead terminal is reduced. In this case, cooling down a LED mounted substrate itself is an only method to lower the temperature.

Therefore, according to the display device disclosed in the above patent document 1, as to a display unit having a LED mounted substrate which is molded with a resin and the like, the heat of the LED mounted substrate is removed by forming a ventilation hole so as to penetrate the display unit from its front to back surface, and sending wind from blowing means to the ventilation hole.

In addition, although several number of the above-described display units are arranged in an actual display panel to implement large-sized screen, according to the display device disclosed in the above patent document 1, a power supply is provided outside the display unit. In this case, the thermal effect of the heat from the power supply to the substrate can be easily avoided.

SUMMARY OF THE INVENTION

According to the display device disclosed in the above patent document 1, as described above, the cooling ability for the substrate can be improved to some extent actually, by providing the ventilation hole so as to penetrate the display unit from its front to back and flowing the wind. However, in this case, it is necessary to provide the ventilation hole in the display unit, thereby the manufacturing cost is increased and the structure of the device becomes complicated. In addition, since a mold material surrounding the substrate and the ventilation hole serves as thermal resistance, the cooling efficiency is lowered for that. Furthermore, it is necessary to take measures to drain rainwater and the like that could enter the ventilation holes, which causes the manufacturing cost to be further increased and the structure to become more complicated.

In addition, according to the display device disclosed in the patent document 1, as described above, since the power supply is provided outside the display unit, the thermal effect of the heat from the power supply to the substrate can be easily avoided. However, its maintenance function or assembling performance to a module deteriorates as compared with the case the power supply is incorporated in each unit.

The present invention was made in view of the above technical problems and it is a basic object of the present invention to cool down a substrate on which the light emitting elements are arranged uniformly and efficiently in a display device using light emitting elements without causing its cost to be excessively increased or its structure to become excessively complicated.

Thus, a display device according to the present invention includes a substrate having light emitting elements for display on a front surface; a substrate supporting body having an opening in the center and positioned on a back side of the substrate to support a peripheral region of the substrate; a case body positioned on a back surface side of the substrate supporting body and covering a part of the center opening; a fan unit arranged in the case body; a wind path plate arranged between the fan unit and the back surface of the substrate and forming a wind path to pass airflow generated by driving the fan unit only on the back side of the substrate; and a power supply arranged in the case body and on a back surface of the wind path plate;, and wherein the airflow impinges the wind path plate through the fan, thereafter passes through the wind path and is discharged to the outside from the back side of the wind path plate.

According to the present invention, the wind path plate forming the wind path to pass the airflow generated by driving the fan unit is provided between the back surface of the substrate having the light emitting elements for display on the front surface and the fan unit, and the airflow generated by driving the fan unit impinges the wind path plate through the fan, thereafter passes through the wind path and is discharged to the outside from the back side of the wind path plate. Therefore, the substrate can be uniformly cooled down all over the whole surface from its back surface by the airflow passing through the wind path. Thus, since the light emitting elements on the substrate can be cooled down uniformly and efficiently, an even-colored and high-reliability display device can be obtained. In this case, since the structure can be provided by a relatively simple way such as by providing the wind path plate between the back surface of the substrate and the fan unit, the structure is not complicated and the cost is not high like the conventional case.

DETAILED DESCRIPTION OF THE PREFERRED EMBODIMENTS

Embodiments of the present invention will be described in detail with reference to the accompanying drawings hereinafter.

First Embodiment

Figure 1:
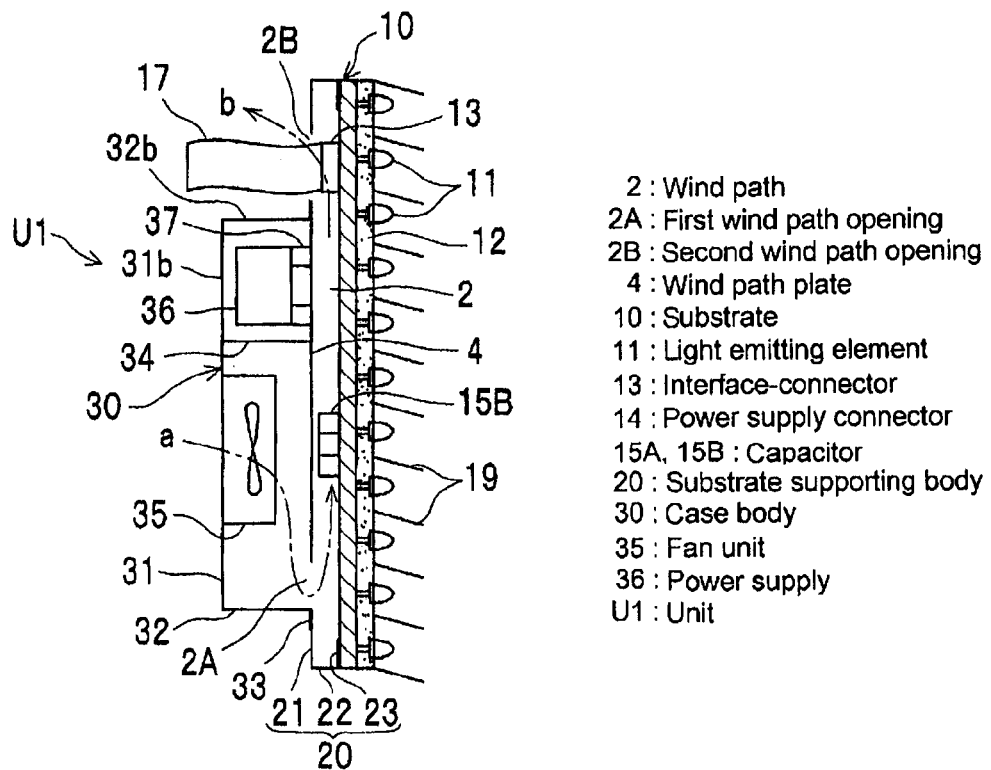
FIG. 1 is a sectional view showing a schematic sectional structure of a single unit of a display device according to a first embodiment of the present invention.
Figure 2:
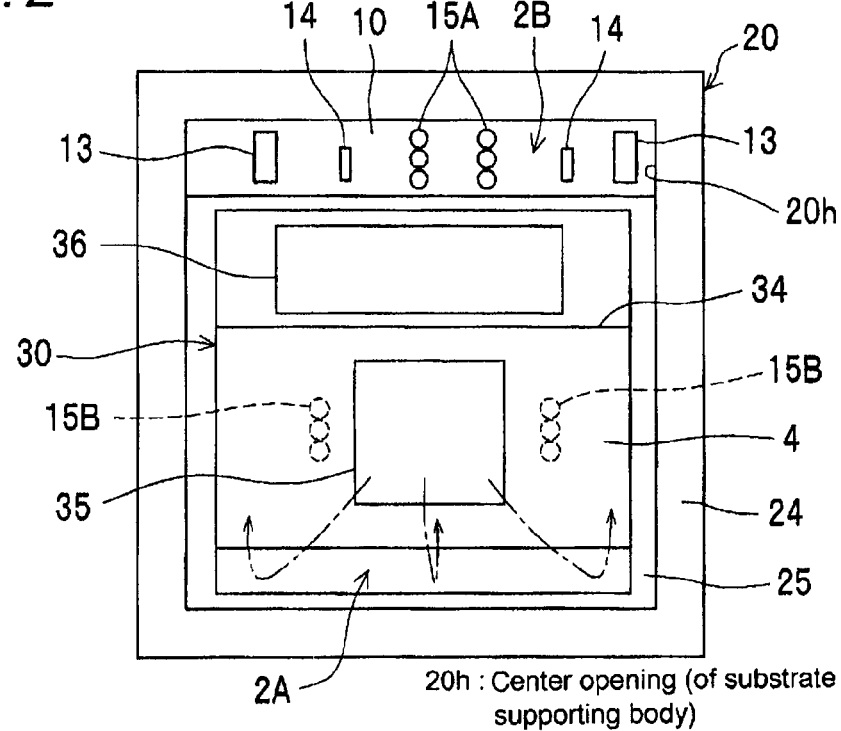
FIG. 2 is a back view showing a schematic back structure of the single unit.

FIG. 1 is a schematic sectional view showing a sectional structure of a single unit of a display device according to a first embodiment of the present invention, and FIG. 2 is a schematic back view showing a back surface structure of the single unit.

As shown in the above views, a (single) unit U1 of the display device according to the first embodiment includes a rectangular substrate 10 on which light emitting elements 11 for display are arranged on a front surface (right surface in FIG. 1), and a rectangular substrate supporting body 20 positioned on the back surface deft surface in FIG. 1) side of the substrate 10 to support a peripheral region of the substrate 10.

The substrate supporting body 20 has a rectangular opening 20h (center opening) in the center and it is in the shape of a frame in planar view, and its peripheral part supports the back surface of the peripheral region of the substrate 10.

More specifically, the substrate supporting body 20 has a kind of U-shaped sectional structure consisting of a back plate 21, a side plate 22 extending from the peripheral part of the back plate 21 to the front side, and a receiver part 23 provided by folding the front end of the side plate 22. And the substrate 10 is fixed on the front side of the receiver part 23 with a screw, for example.

As can be clearly understood from FIG. 2, a frame-shaped mounting region 24 is provided around the periphery of the substrate supporting body 20 on its back surface side. The mounting region 24 is to mount the substrate supporting body 20 (that is, the unit U1) on a mounting frame of a display module (both are not shown).

The unit U1 is mounted on the mounting frame of the display module through the mounting region 24, and when a plurality of modules is assembled, the display device with a large screen can be obtained.

The light emitting element 11 is a so-called LED element and many of them are arranged almost all over the front surface of the substrate 10 at predetermined intervals. Eaves 19 are mounted on the front surface of the substrate 10 to enhance contrast. Further, a plurality of interface-connectors 13, a plurality of power supply connectors 14, and a plurality of capacitors 15A and 15B are provided on the back surface of the substrate 10. Furthermore, although they are not specifically shown, other parts such as an LED control IC are mounted.

In addition, according to this embodiment, the display device is for outdoor use and after the substrate 10 has been screwed to the substrate supporting body 20, the front surface of the substrate on which the LEDs are mounted and a lead part (not shown) are covered with a mold resin 12.

A case body 30 covering a part of the center opening 20h (specifically, all part of the center opening 20h except for an opening having a predetermined length on its one end side) is arranged on the back surface of the substrate supporting body 20. A frame-shaped case mounting region 25 to mount the case body 30 is provided inside the mounting region 24, on the back surface of the substrate supporting body 20.

The case body 30 includes a back plate 31, a side plate 32 extending from a peripheral part of the back plate 31 toward the front side, and a flange part 33 provided at the front end of the side plate 32 to be formed into almost the shape of a hat in section. And when the flange part 33 is set on the case mounting region 25 and fixed with a screw, the case body 30 is mounted on the back surface of the substrate supporting body 20. In addition, it is to be noted that the back plate 31 of the case body 30 is removed for simplifying the drawing in the back view shown in FIG. 2.

The case body 30 covers a part of the center opening 20h from the back side of the substrate supporting body 20, and specifically, as described above, it covers all over the center opening 20h except for the opening having the predetermined length on one end side (upper end side in FIGS. 1 and 2). In other words, the opening having the predetermined length on one end side of the center opening 20h is not covered with the case body 30 and is remaining. In addition, the opening having the predetermined length corresponds to a wind path opening 2B that will be described below.

A fan unit 35 for cooling the back surface side of the substrate 10 is arranged in the case body 30. The fan unit 35 is fixed to the back plate 31 of the case body 30 with a screw.

In addition, a partition 34 for dividing the inside into two sections is provided in the case body 30. The fan unit 35 is provided in one section (that is, the section apart from the opening having the predetermined length), and a power supply 36 for the unit U1 is provided in the other section (that is, the section close to the opening having the predetermined length).

The power supply 36 is screwed to the back side of a wind path plate 4 to be described below through a plurality of mounting bases 37. That is, a distance corresponding to the height of the mounting base 37 is provided between the power supply 36 and the wind path plate 4. In addition, a certain distance is provided also between the power supply 36 and the partition 34.

Furthermore, the power supply 36 is arranged in a location corresponding to a region between first and second wind path openings 2A and 2B of the wind path 2 which is to be described below.

In addition, openings for releasing heat of the power supply 36, although they are not specifically shown, are provided at a part 31b in the back plate 31 of the case body 30 so as to correspond to the power supply 36 (that is, a part upper than the partition 34 in FIG. 1) and a part 32b in the side plate 32 so as to correspond to the side surface of the power supply 36. The wind heated by power supply cooling is discharged to the outside of the device through those openings for releasing the heat of the power supply.

According to this embodiment, the wind path plate 4 for forming the wind path 2 to pass airflow generated by driving the fan unit 35 is provided between the fan unit 35 and the back surface of the substrate 10. The wind path plate 4 is to form said wind path only on the side of the back surface of the substrate 10 and the wind path plate 4 is fixed to the flange 33 of the case body 30 with a screw, for example.

One end of the wind path plate 4 (upper end part in FIGS. 1 and 2) almost coincides with the one end part of the case body 30 and therefore, the wind path opening 2B (second wind path opening) through which the airflow blows in and out of the wind path 2 is formed between the opening edge of the one end of the center opening 20h of the substrate supporting body 20 and the one end part of the wind path plate 4. The wind path opening 2B almost coincides with the opening having the predetermined length that is not covered with the case body 30 and is remaining, in the center opening 20h of the substrate supporting body 20.

A certain distance is provided between the other end of the wind path plate 4 (lower end part in FIGS. 1 and 2) and the side plate 32 of the case body 30, and this distance constitutes the wind path opening 2A (first wind path opening) through which the airflow blows in and out of the wind path 2.

At least one part of the connector and/or capacitor arranged on the back side of the substrate 10, that is, the above-described plurality of interface-connectors 13, the plurality of power supply connectors 14, and the plurality of capacitors 15A are positioned at the portion corresponding to the second wind path opening 2B. These parts are arranged substantially at the same intervals along the width direction of the wind path 2.

It is to be noted that the term "connector and/or capacitor" means "at least one of the connector and capacitor" in this specification.

In addition, all the connectors and capacitors including the plurality of capacitors 15B are arranged in the wind path 2 in the direction (vertical direction in FIGS. 1 and 2) of the airflow.

In the above constitution, when the fan unit 35 is driven, the airflow thus generated is drawn from the back surface side to the wind path plate 4, passes through the wind path 2 and is discharged to the back surface side to the wind path plate 4.

As to the operation of the fan unit 35, there are set two modes such as a "blow-in mode" and a "blow-out mode". In the blow-in mode, the air from the fan unit 35 is sent in a direction to blow in the back surface of the substrate 10. And in the blow-out mode, the air drawn by the fan unit 35 is sent in a direction to blown out from the back surface side of the substrate 10. These modes can be implemented by setting the fan 35 reversely.

In the case of the blow-in mode, as shown in dashed-dotted line arrows "a" and "b" in FIG. 1, the air taken in from the back surface side of the wind path plate 4 is sent in the direction to blow in the back surface of the substrate 10 by the fan unit 35, but stopped by the wind path plate 4. That is, the airflow impinges the wind path plate 4 through the fan. Thus, the air flow changes its flow direction and proceeds along the wind path plate 4 and enters the wind path 2 from the first wind path opening 2A and cools down the substrate 10 while passing through the wind path 2 and then comes out from the second wind path opening 2B toward the back surface side of the wind path plate 4.

Thus, the air sent from the fun unit 35 is not applied to the substrate 10 directly (that is, it is not applied to the substrate 10 at some angles), and it can almost uniformly cool down the substrate 10 almost all over the back surface thereof while passing through the wind path 2 along the substrate 10 and the wind path plate 4. Particularly, the airflow drawn by the fan unit 35 spreads in the wind path 2 due to pressure drop from the fan unit 35 to the second wind path opening 2B, and as a result, the speed of the wind flowing on the back surface of the substrate 10 becomes more uniform. Thus, the temperature distribution of the substrate 10 and the temperature distribution of the LED elements 11 can be more uniform. It is to be noted that the pressure drop is increased because the wind path plate 4 exists, and the total air volume by the fan unit 35 is reduced in general.

Figure 3:
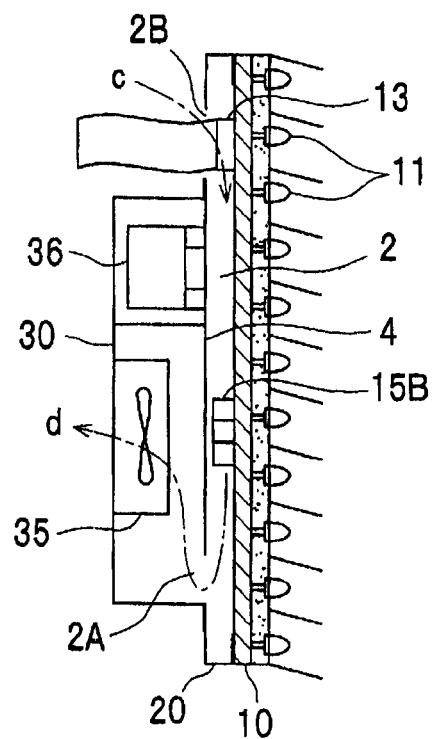
FIG. 3 is a sectional view when a fan unit in the single unit operates in a blow-out mode.

Meanwhile, in the case of the blow-out mode, as shown by dashed-dotted line arrows "c" and "d" in FIG. 3, the air taken in from the back surface side of the wind path plate 4 enters the wind path 2 through the second wind path opening 2B and cools down the substrate 10 while passing through the wind path 2 and then blown out from the fan unit 35 through the first wind path opening 2A toward the back surface side to the wind path plate 4.

In this blow-out mode also, the air drawn by the fan unit 35 is not applied to the substrate 10 directly (that is, it is not applied to the substrate 10 at some angles), and it can almost uniformly cool down the substrate 10 almost all over the back surface thereof while passing through the wind path 2 along the substrate 10 and the wind path plate 4, so that the same effect as that of the blow-in mode can be provided.

Figure 4:
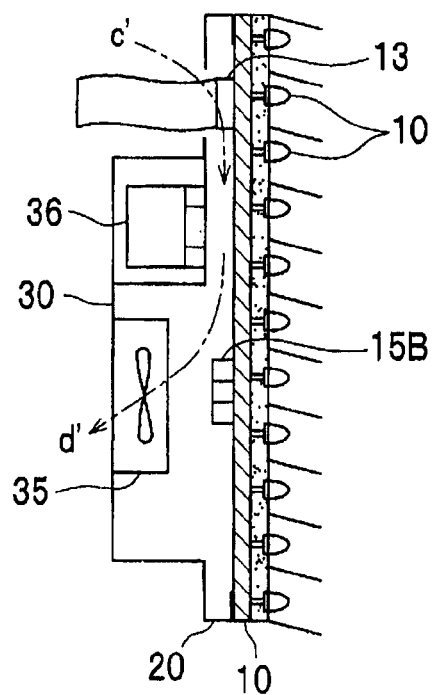
FIG. 4 is a sectional view showing one example when a wind path plate is not provided in the blow-out mode.

In addition, FIG. 4 is an explanatory view showing airflow when the wind path plate is not provided in the blow-out mode. As can be seen from FIG. 4, when the above-described wind path plate is not provided, the air drawn from the back surface side of the unit is blown out through the fan unit 35 without reaching the vicinity of the opposite side of the substrate 10 as shown by dashed-dotted line arrows "c'" and "d'". Accordingly, an almost uniform cooling effect almost all over the back surface of the substrate 10 cannot be provided.

Figure 5:
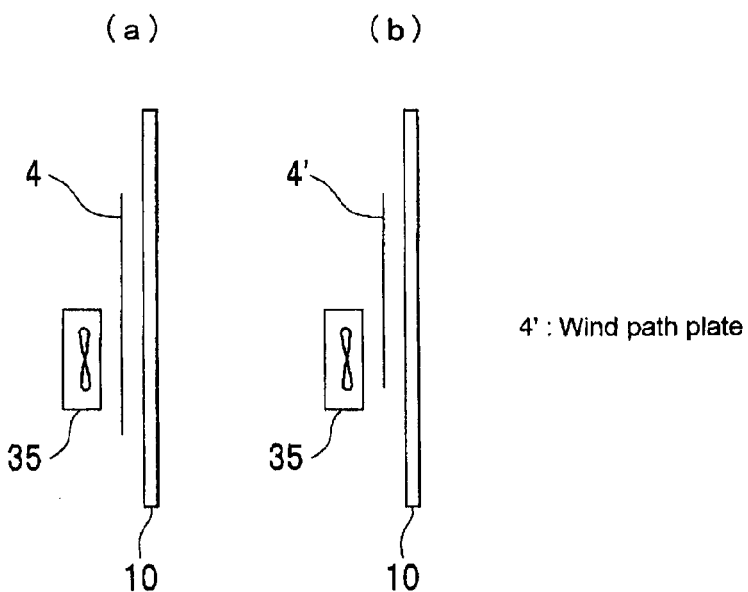
FIG. 5 is an explanatory view illustrating a positional relation between the fan unit, the wind path plate and a substrate.

FIGS. 5(A) and 5(B) are explanatory views schematically showing the example of the positional relation between the substrate 10, the fan unit 35 and the wind path plates 4 and 4'.

According to the example shown in FIGS. 1, 2 and 3, as shown in FIG. 5(A) schematically, the front side of the fan unit 35 is completely covered with the wind path plate 4, so that the above-described effect can be provided. However, as shown in FIG. 5(B), even when only a part of the front side of the fan unit 35 is covered with the wind path plate 4', a considerable improvement effect can be obtained.

As described above, in this embodiment, the wind path plate 4 is provided between the fan unit 35 and the back surface of the substrate 10 having the LEDs 11 on its front surface to form the wind path 2 which allows the airflow generated by driving the fan unit 35 to pass therethrough. The airflow generated by driving the fan unit 35 is drawn from the back surface side to the wind path plate 4, passes through the wind path 2, and is discharged toward the back surface side to the wind path plate 4. Accordingly, the substrate 10 can be relatively uniformly cooled down all over its back surface by the airflow in the wind path 2. Thus, the LEDs 11 on the substrate 10 can be efficiently and uniformly cooled down, so that an evenly-colored and high-reliability display device can be provided. In this case, since the constitution can be relatively simple because the wind path plate 4 is only provided between the back surface of the substrate 10 and the fan unit 35, the structure does not become excessively complicated and the cost is not excessively increased unlike the conventional case.

In addition, according to this embodiment, as described above, the power supply 36 is fixed to the back surface side of the wind path plate 4 through the plurality of mounting bases 37 and the distance corresponding to the height of the mounting base 37 is provided between the power supply 36 and the wind path plate 4.

Therefore, the heat generated in the power supply 36 is not directly transferred to the wind path plate 4, so that the temperature of the air flowing in the wind path 2 is prevented from being raised by the heat from the power supply 36 to lower the cooling effect. Thus, in the constitution in which the power supply 36 is provided in each unit U1, the heat from the power supply 36 can be prevented from affecting the cooling effect of the substrate 10 as much as possible.

In addition, as described above, since the certain distance is also provided between the power supply 36 and the partition 34, the heat generated in the power supply 36 is prevented from being directly transferred to the wind path plate 4 similarly.

In this embodiment, as described above, the power supply 36 is arranged in a location corresponding to a region between the first wind path opening 2A and the second wind path opening 2B of the wind path 2, more specifically positioned in a location corresponding to a region between the fan unit 35 and the second wind path opening 2B.

Therefore, in the case where the operation mode of the fan unit 35 is in the blow-in mode, the affect of the air in the wind path 2 warmed by heat generated in the power supply 36 is limited to the downstream side of the wind path 2. Accordingly, a deterioration of the cooling efficiency can be more restrained. While in the case where the operation mode of the fan unit 35 is in the blow-out mode, since the air in the wind path 2 warmed by heat generated in the power supply 36 affects up to the upstream side of the wind path 2, the cooling efficiency is lowered, but the temperature distribution of the substrate 10 is improved as compared with the case of the blow-in mode.

It should be determined depending on the cooling specification of the whole system whether more emphasis is put on the maintenance and enhancement of the cooling efficiency or the good substrate temperature distribution. According to the embodiment, the power supply 36 is set in a location corresponding to a region between the first wind path opening 2A and the second wind path opening 2B of the wind path 2 serving as the inlet and outlet of the wind path 2. Thereby, a merit to improve the cooling efficiency or the substrate temperature distribution can be obtained, in addition, a compact unit constitution can be implemented.

In addition, according to this embodiment, as described above, the connector and capacitor arranged on the back surface of the substrate 10, that is, the plurality of interface/connectors 13, the plurality of power supply connectors 14 and the plurality of capacitors 15A and 15B are arranged along the airflow direction (vertical direction in FIGS. 1 and 2) in the wind path 2, respectively.

The required volumes of the capacitors 15A and 15B are determined depending on their specification. Accordingly, when their thicknesses are limited, an occupied area by them in the substrate 10 must be increased. Therefore, in many cases, they are higher than a control IC, for example, and they become obstacles which increase wind path resistance for the airflow in the wind path 2. In the case of the connectors 13 and 14, they are connected from the substrate 10 to an external device (not shown) by a cable 17. Accordingly, they become also obstacles which increase wind path resistance for the airflow in the wind path 2.

Thus, according to this embodiment, these parts are arranged along the airflow direction in the wind path 2, respectively. Thereby, an increase of the wind path resistance is prevented as much as possible. That is, they are mounted on the back surface of the substrate 10 such that the longer sides of the connectors 13 and 14 having a rectangular shape in a plan view and the alignments of the capacitors 15A and 15B are arranged so as to be parallel to the airflow in the wind path 2.

According to this constitution, since an increase of the wind path resistance is restrained and stagnation area of the airflow in the wind path 2 can be minimized, the variation of the temperature distribution of the substrate 10 can be minimized. Furthermore, since the wind path resistance becomes small, an air volume is increased and the cooling efficiency of the substrate 10 can be enhanced.

In addition, by providing the wind path plate 4 to control the direction of the flow on the back surface side of the substrate 10 so as to be one direction (direction parallel to the arrangement of the LEDs 11), the long sides of the connectors 13 and 14 and the alignments of the capacitors 15A and 15B can be easily arranged so as to be parallel to the airflow.

Furthermore, according to this embodiment, as described above, at least one part of the connectors and/or capacitors arranged on the back surface of the substrate 10, that is, the plurality of interface/capacitors 13, the plurality of power supply connectors 14 and the plurality of capacitors 15A are arranged in an area corresponding to the second wind path opening 2B.

The connectors 13 and 14 mounted on the back surface of the substrate 10 are connected to the external device (not shown) by the cable 17. Thus, when the connectors 13 and 14 are set in the wind path 2, a clearance of about 1 to 2 mm is needed around the connectors 13 and 14, and it is considered that the air leaks and the air volume is reduced. In addition, when the capacitor which is higher than the height of the wind path 2 is employed, it is necessary to provide an opening in the wind path plate so that the capacitor projects from it. In this case, an air leakage will occur, thereby the air volume is reduced, and also the manufacturing cost will be increased.

In the present embodiment, as described above, the plurality of interface-connectors 13, the plurality of power supply connectors 14 and the plurality of capacitors 15A are arranged in the area corresponding to the second wind path opening 2B serving as the inlet and outlet of the wind path 2. Accordingly, it is not necessary to worry about the affect of the air leakage when these parts are set, so that the cooling efficiency of the substrate 10 can be further improved.

Furthermore, in the present embodiment, as described above, the plurality of interface-connectors 13, the plurality of power supply connectors 14 and the plurality of capacitors 15A disposed in the area corresponding to the second wind path opening 2B are arranged at the substantially same intervals along the width direction of the wind path 2.

According to such arrangement, the air can flow uniformly in the width direction of the wind path 2, so that the variation of the temperature distribution of the substrate 10 can be minimized. Therefore, it is possible to produce a display device which can display a evenly-colored and high-quality image.

Second Embodiment

Next, a second embodiment of the present invention will be described.

In the following explanation, elements of the second embodiment having substantially same structures and substantially same effects as those of the first embodiment will be designated with the same symbols and further explanation thereof will be omitted.

Figure 6:
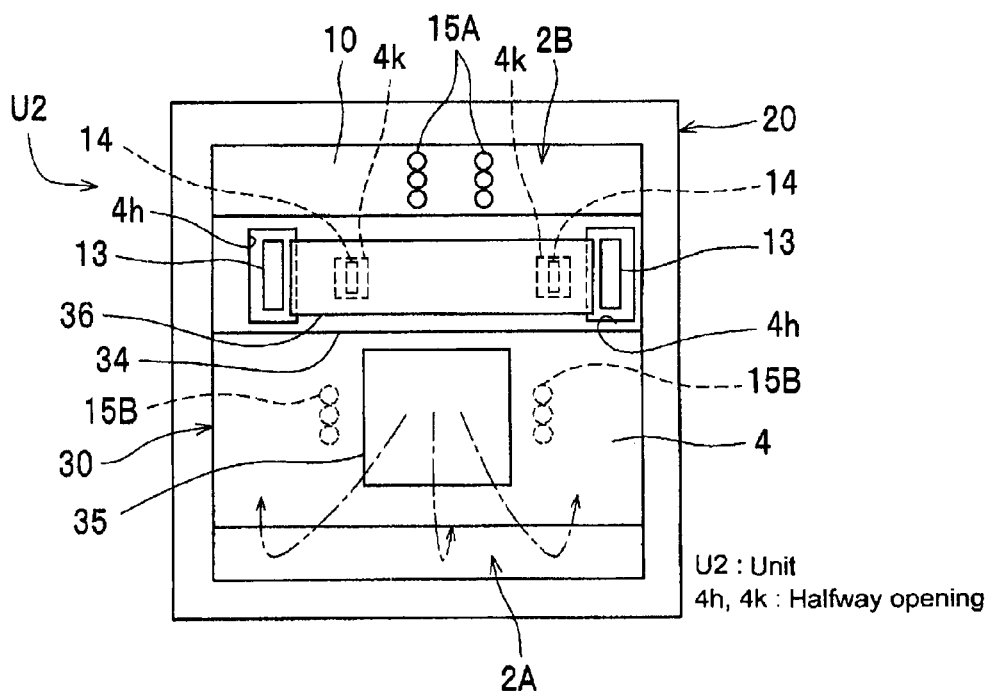
FIG. 6 is a back view showing a schematic back structure of a single unit according to a second embodiment of the present invention.

FIG. 6 is a back view schematically showing a back structure of a single unit of a display device according to the second embodiment of the present invention, which corresponds to FIG. 2 in the first embodiment.

As shown in this drawing, in a (single) unit U2 of the display device according to the second embodiment, as similar to the case in the first embodiment, a second wind path opening 2B to flow air in or out of the wind path 2 is provided between an opening edge of a center opening 20h of a substrate supporting body 20 and one end of a wind path plate 4. In addition, in a case body 30, a power supply 36 is arranged closer to the second wind path opening 2B than a fan unit 35, and the wind path plate 4 is positioned on the front surface side of the power supply 36.

In the wind path plate 4 according to the second embodiment, halfway openings 4h and 4k are provided in a halfway of the wind path 2. They are set in locations corresponding to a region between the second wind path opening 2B and the fan unit 35. More preferably, the halfway openings 4h and 4k are provided at the places corresponding to an interface-connector 13 and a power supply connector 14, respectively. Thus, a connector cable (not shown) to connect a substrate 10 and an external device (not shown) is inserted into the halfway opening 4h corresponding to the interface-connector 13, and a connector cable (not shown) to connect the substrate 10 to the power supply 36 is inserted into the halfway opening 4k corresponding to the power supply connector 14.

Thus, in the wind path plate 4, the halfway opening 4h in a halfway of the wind path 2 is provided at a location corresponding to a region between the second wind path opening 2B and the fan unit 35, thereby, the cooling performance for the power supply 36 is improved. It is to be noted that, in this case, since a part of the airflow to cool down the substrate 10 is used to cool down the power supply 36, the cooling ability to the substrate 10 is lowered for that. Therefore, this embodiment is effective in a case where the cooling down the power supply 36 is severely required more than to cool down the substrate 10 (that is, cool down the LED element 11).

In addition, since the connector cables are inserted through the halfway openings 4h and 4k, while the power supply 36 is cooled down, the substrate 10 can be connected with the external device (not shown) and with the power supply 36. Particularly, since the distance between the substrate 10 and the power supply 36 is short, the cable length can be shortened and the constitution can be simplified and made compact in the case of the power supply connector 14.

In addition, when a clearance around the connector is limited to a small value (not more than several millimeters), since a static pressure difference with the outer air can be small, the air flow is not likely to leak. Therefore, when the connector cannot be set in the second wind path opening 2B in view of its layout or when it is not necessary to use the airflow for cooling down the substrate 1 as the airflow to cool down the power supply 36, the above clearance may be further reduced.

In this case, since the airflow can be used efficiently and the reduction in air volume can be minimized, the variation of the temperature distribution of the substrate 10 can be minimized and the cooling efficiency can be improved. That is, it becomes to be possible to produce a high-efficiency and high-reliability display device with an even-colored and high-quality image.

As described above, the heated wind after the power supply cooling is discharged to the outside of the device through openings (not shown) for releasing the heat of the power supply provided at a part 31b (refer to FIG. 1) in the back plate 31 of the case body 30 so as to correspond to the power supply 36, and a part 32b in the side plate 32 so as to correspond to the side surface of power supply 36. It is to be noted that the opening for releasing the heat of the power supply can improve the heat radiation of the power supply 36 due to self-cooling (convection flow of the air) even when the halfway openings 4h and 4k are not provided in the wind path plate 4.

Third Embodiment

Next, a third embodiment of the present invention will be described.

Figure 7:
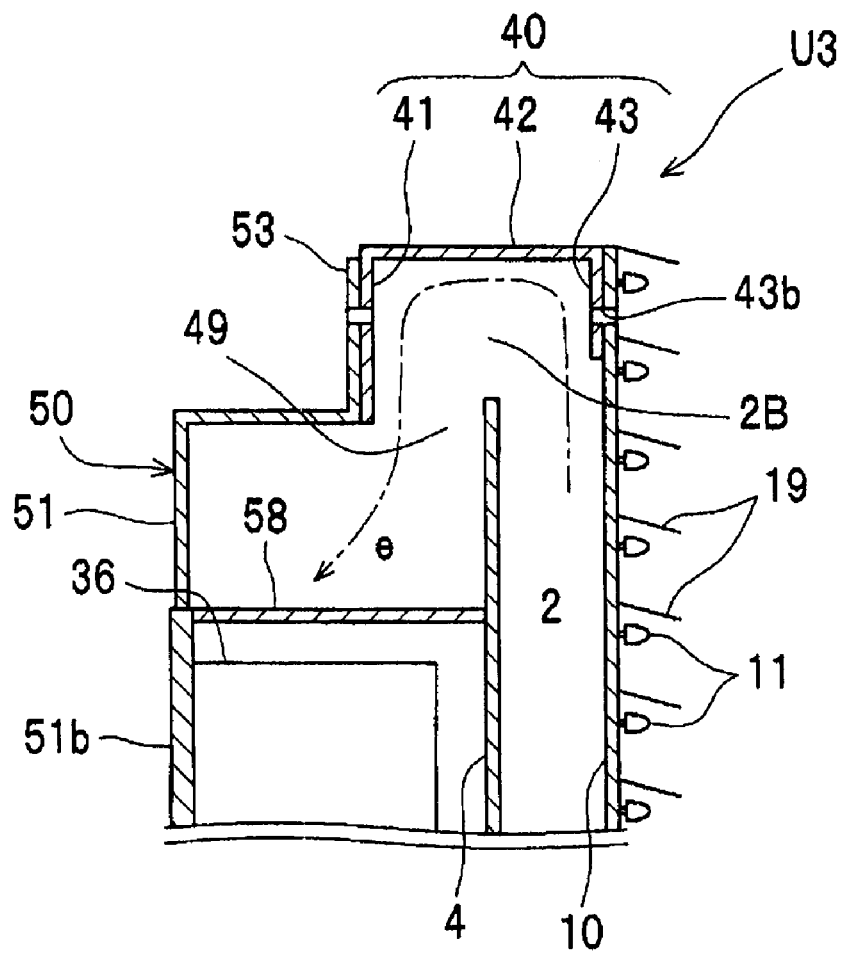
FIG. 7 is a partially enlarged sectional view showing a schematic sectional structure of a single unit according to a third embodiment of the present invention.

FIG. 7 is a partially enlarged sectional view schematically showing a part of a sectional structure of a single unit of a display device according to the third embodiment.

As shown in FIG. 7, according to a (single) unit U3 of the display device in the third embodiment, a substrate supporting body 40 has a U-shaped sectional structure consisting of a back plate 41, a side plate 42 extending from the peripheral part of the back plate 41 to the front, and a receiver part 43 provided by folding the front end of the side plate 42. And the receiver part 43 is provided with a screw hole 43b for a screw to fix a substrate 10 on the front surface side of the receiver part 43.

In this case, a flange part 53 of a case body 50 is fixed to the back plate 41 of the substrate supporting body 40 with a screw, on the end portion of the unit shown in FIG. 7.

In this embodiment, the distance between the receiver part 43 and the back plate 41 of the substrate supporting body 40 is set larger than the distance between the substrate 10 and a wind path plate 4. And, at an end of the wind path plate 4, an opening 49 communicated with the wind path 2 is formed between the end of the wind path plate 4 and the back plate 41 of the substrate supporting body 40.

Therefore, as shown by a dashed-dotted line arrow "e" in FIG. 7, the airflow that has reached the end of the wind path plate 4 through the wind path 2 can flows in the substantial opposite direction through the opening 49 without stagnating at the end of the substrate 10.

In the first and second embodiments, the distance between the receiver part 23 and the back plate 21 of the substrate supporting body 20 is set to be almost equal to the distance between the substrate 10 and the wind path plate 4 and as a result, the air stagnates occur at the end of the substrate 10, which is part of reason that the temperature of the substrate 10 to become uneven.

According to this embodiment, the air does not stagnate at the end of the substrate 10 because of the above constitution. Therefore, the temperature of the substrate 10 can be effectively prevented from becoming uneven, and thereby it becomes to be possible to produce a high-efficiency and high-reliability display device with an even-colored and high-quality image.

In addition, according to this embodiment, a power supply 36 is arranged relatively closer to the opening 49, so that more airflow can be applied to the power supply 36 to enhance the cooling effect.

In this case, a connection plate 58 to connect the back plate 51 of the case body 50 and the wind path plate 4 is provided at the side of the power supply 36, openings (not shown) to release the heat of the power supply are formed at the connection plate 58 and a part 51b in the back plate 51 so as to correspond to the power supply 36. The airflow from the opening 49 communicated with the wind path 2 passes through a heat releasing opening (not shown) for the power supply provided in the connection plate 58 to cool down the power supply 36 and the airflow heated by cooling down the power supply is discharged to the outside of the device through the heat releasing opening (not shown) formed at the part 51b in the back plate 51 so as to correspond to the power supply 36.

When the connection plate 58 is not provided, much more airflow is applied to the power supply 36 and the cooling effect can be further enhanced. However, in this embodiment, from a view of sufficiently ensuring strength and rigidity of the case body 50, the connection plate 58 is provided to connect the back plate 51 and the wind path plate 4 to achieve reinforcement effect of the structure.

It is to be noted that, in those embodiments explained above, the same effect can be obtained even when a substrate on which an element other than the LED element (for example, logic IC) is used as the wind path plate 4. In this case, the substrate 10 on which the LED element 11 is mounted and the substrate on which the element other than the LED element is mounted are connected by a connector (interface).

Thus, the present invention is not limited to those described in the above embodiments and it is needless to say, various kinds of modifications and variations may be added to the illustrated embodiments within the same or equal scope of the present invention.

What is claimed is:

1. A display device comprising:
   a substrate comprising light emitting elements for display on a front surface;
   a substrate supporting body having an opening in the center and positioned on a back side of the substrate to support a peripheral region of the substrate;
   a case body positioned on a back surface side of the substrate supporting body and covering a part of the center opening;
   a fan unit arranged in the case body, wherein the fan unit is configured and positioned to create an airflow directed to or from the back side of the substrate;
   a wind path plate arranged entirely between the fan unit and the back surface of the substrate and forming a wind path between the wind path plate and the back side of the substrate, the wind path extending generally parallel to the back side of the substrate; and
   a power supply arranged in the case body and on a side of the wind path plate opposite the wind path,
   wherein the wind path plate is arranged such that an airflow directed to the back side of the substrate by the fan unit will impinge the wind path plate and will not directly impinge the back side of the substrate, and
   wherein the airflow thereafter passes through the wind path in a direction generally parallel to the back side of the substrate, and is discharged to the outside.

2. The display device according to claim 1, wherein a predetermined distance is provided between the wind path plate and the power supply.

3. The display device according to claim 1, wherein the power supply is arranged in a location corresponding to a region between an airflow inlet and an airflow outlet of the wind path.

4. The display device according to claim 1,
   wherein a connector and/or capacitor is arranged on the back surface of the substrate; and
   wherein the connector and/or capacitor is arranged along the airflow direction in the wind path.

5. The display device according to claim 1,
   wherein a plurality of connectors and/or capacitors are arranged on the back surface of the substrate; and
   wherein the plurality of connectors and/or capacitors are arranged at substantially equal intervals along a width direction of the wind path.

6. The display device according to claim 1,
   wherein a wind path opening for allowing the air to flow in or out of the wind path is formed between an opening edge of the center opening of the substrate supporting body and one end of the wind path plate;
   wherein a connector and/or capacitor is arranged on the back surface of the substrate; and
   wherein at least one part of the connector and/or capacitor is arranged at a part corresponding to the wind path opening.

7. The display device according to claim 1,
   wherein a wind path opening for allowing the air to flow in or out of the wind path is formed between an opening edge of the center opening of the substrate supporting body and one end of the wind path plate to allow the air to flow in or out of the wind path;
   wherein the power supply is arranged in the case body so as to be closer to the wind path opening than the fan unit, and the wind path plate is positioned on the front surface side of the power supply; and
   wherein a second opening is arranged in a location corresponding to a region between the wind path opening of the wind path plate and the fan unit.

8. The display device according to claim 7, wherein a connector cable is inserted through the second opening.

9. The display device according to claim 1,
   wherein the substrate supporting body comprises a front part to support the back surface of the substrate and a back part spaced apart from the front part at a predetermined distance;
   wherein the predetermined distance is set larger than the distance between the substrate and the wind path plate; and
   wherein at the end of the wind path plate, an opening communicated with the wind path is formed between the end of the wind path plate and the back part of the substrate supporting body.

* * * * *